United States Patent
Fuchs

(10) Patent No.: US 10,232,555 B2
(45) Date of Patent: Mar. 19, 2019

(54) PLASTIC WELDING DEVICE AS WELL AS RESPECTIVE PLASTIC WELDING METHOD

(71) Applicant: BRANSON ULTRASCHALL Niederlassung der Emerson Technologies GmbH & Co. OHG, Dietzenbach (DE)

(72) Inventor: Silvio Fuchs, Hasselroth (DE)

(73) Assignee: BRANSON ULTRASCHALL Niederlassung der Emerson Technologies GmbH & Co. OHG, Dietzenbach (DE)

( * ) Notice: Subject to any disclaimer, the term of this patent is extended or adjusted under 35 U.S.C. 154(b) by 406 days.

(21) Appl. No.: 14/937,351

(22) Filed: Nov. 10, 2015

(65) Prior Publication Data

US 2016/0129627 A1    May 12, 2016

(30) Foreign Application Priority Data

Nov. 12, 2014 (DE) .......................... 10 2014 223 121

(51) Int. Cl.
*B32B 37/00* (2006.01)
*B29C 65/06* (2006.01)
(Continued)

(52) U.S. Cl.
CPC .......... *B29C 65/06* (2013.01); *B29C 65/1412* (2013.01); *B29C 65/1432* (2013.01);
(Continued)

(58) Field of Classification Search
CPC ............ B29C 65/1412; B29C 65/1432; B29C 65/7841; B29C 66/0242; B29C 66/301;
(Continued)

(56) References Cited

U.S. PATENT DOCUMENTS 4,514,242 A * 4/1985 MacLaughlin ... B29C 66/83221
156/273.3
7,122,088 B2  10/2006 Field et al.
(Continued)

FOREIGN PATENT DOCUMENTS

CN         1309550 C    4/2007
CN       202318938 U    7/2012
(Continued)

OTHER PUBLICATIONS

EP Search Report for EP Application No. 15192530.2 dated Mar. 29, 2016 (7 pages).
(Continued)

*Primary Examiner* — James D Sells
(74) *Attorney, Agent, or Firm* — Reising Ethington P.C.

(57) ABSTRACT

The plastic welding device comprises first and second tools arranged respectively at a first support and a second support. The first tool is further movable by a first drive with respect to the first support in a first direction linearly between a first position and a second position. The movement along the first direction is defined by a first imaginary spherical coordinate system, the origin of which is arranged in the first position of the first tool. The z-axis as a first z-axis extends in the direction of the second support. For a first inclination angle between the first z-axis which is positive in the direction of the second support and the first direction it applies $0 \leq \upsilon_1 \leq \pi/2$, whereby a first component in the first tool can be brought into engagement with a second component in the second tool.

11 Claims, 12 Drawing Sheets

(51) Int. Cl.
*B29C 65/14* (2006.01)
*B29C 65/78* (2006.01)
*B29C 65/00* (2006.01)
B29L 31/00 (2006.01)
B29L 31/30 (2006.01)

(52) U.S. Cl.
CPC ...... *B29C 65/7841* (2013.01); *B29C 66/0242* (2013.01); *B29C 66/301* (2013.01); *B29C 66/54* (2013.01); *B29C 66/8322* (2013.01); *B29C 66/83221* (2013.01); *B29C 66/8432* (2013.01); *B29L 2031/30* (2013.01); *B29L 2031/747* (2013.01)

(58) Field of Classification Search
CPC ................ B29C 66/54; B29C 66/8322; B29C 66/83221; B29C 66/8432
USPC ....................................................... 156/73.5
See application file for complete search history.

(56) References Cited

U.S. PATENT DOCUMENTS

| | | | |
|---|---|---|---|
| 7,343,950 | B2 | 3/2008 | Field et al. |
| 2010/0156164 | A1 | 6/2010 | Donovan et al. |
| 2012/0117772 | A1 | 5/2012 | Nagel et al. |
| 2012/0269999 | A1 | 10/2012 | Kind et al. |

FOREIGN PATENT DOCUMENTS

| | | | |
|---|---|---|---|
| DE | 202005007282 | U1 | 7/2005 |
| DE | 202011003610 | U1 | 11/2011 |
| DE | 202011107417 | U1 | 2/2012 |
| EP | 2450165 | A1 | 5/2012 |
| JP | H08215862 | A | 8/1996 |
| JP | H1120023 | A | 1/1999 |
| JP | 2011037060 | A | 2/2011 |
| KR | 1020120123350 | A | 11/2012 |
| WO | WO2010068150 | A1 | 6/2010 |
| WO | WO2012089287 | A1 | 7/2012 |
| WO | WO2013004279 | A1 | 1/2013 |

OTHER PUBLICATIONS

KR Office Action for Application No. 10-2015-0156598 dated Jan. 16, 2017 (6 pages).
CN Office Action for Application No. 201510777459.7 dated May 10, 2017 (5 pages).
JP Office Action for Application No. 2015-220898 dated Nov. 30, 2016 (4 pages).

* cited by examiner

PLASTIC WELDING DEVICE AS WELL AS RESPECTIVE PLASTIC WELDING METHOD

CROSS REFERENCE TO RELATED APPLICATIONS

This application claims the priority of German patent application No. DE 10 2014 223 121.3, filed on Nov. 12, 2014. The entire content of this priority application is incorporated herein by reference in its entirety.

TECHNICAL FIELD

The present disclosure relates to a plastic welding device as well as a respective plastic welding method.

BACKGROUND

Plastic welding devices comprise usually a housing with a lower tool arranged therein as well as an upper tool arranged therein. The lower tool is fastened to a lifting table, whereas the upper tool is rigidly mounted to an upper tool plate. Further, such known plastic welding devices comprise a preheating arrangement for heating the first and the second component prior to welding. Usually, the preheating arrangement is here coupled to the lifting table. By means of the lifting table, the lower tool can be moved in the direction of the upper tool to weld a first component in the lower tool to a second component in the upper tool, especially by means of friction welding.

Such plastic welding devices are used for example in the automotive industry or in the medical technology. In the automotive industry, such plastic welding devices are used for producing lights but may be used also in the production of other components or component groups which consist of plastic or contain plastic. In a similar way, the plastic welding device may be used in the production of devices and/or component groups in the medical technology or in the production of consumer goods.

The operation of the known plastic welding devices with preheating arrangement is as follows. At first a user places a first component on the lower tool. Subsequently, he positions a second component on the first component in the lower tool. Then, the lifting table with the lower tool and the components arranged thereon moves from an initial position in the direction of the upper tool until the second component abuts the upper tool. This movement takes place along only one axis which is vertical with respect to a floor or ground on which the plastic welding device is arranged.

Then, the lifting table moves along this vertical axis back into an intermediate position in which the preheating arrangement can be arranged from a neutral position into an aligning position between the components. After the preheating arrangement has been arranged between the two components, the preheating arrangement is positioned in a preheating position by means of a new vertical movement of the lifting table so that the two components are heatable at the places to be welded. After the heating, the lifting table is moved along the vertical axis again into the intermediate position and thus the preheating arrangement back into the aligning position. After the preheating arrangement has then been moved back into the neutral position, the lifting table is moved along the vertical axis into a welding position.

Now, a welding of the first component to the second component by means of friction welding or by means of pressing the pre-heated components against each other takes place. After finishing the welding, the lifting table moves with the lower tool and the compound of first and second component arranged thereon along the vertical axis from the welding position back into the initial position. As soon as the lifting table has reached the initial position, the user may remove the compound of first and second component.

A disadvantage of the above described plastic welding device with preheating arrangement becomes apparent if components with complex protrusions or undercuts shall be heated and welded. A protrusion or undercut results in friction welding especially due to the not arbitrary variable angular position of the components to be welded with respect to each other. Especially, the two components have to be placed in the respective tool in such a way that a friction welding force can be transferred effectively to the joining portion of the respective component. Due to this not freely determinable angular position of the two components with respect to each other as well as the movability of the tools solely along the vertical axis, undercuts or protrusions result depending on the components to be welded to each other. During a movement along the vertical axis, these would lead to a damaging and/or destruction of at least one of the components and/or one of the tools or the preheating arrangement.

For eliminating this disadvantage, the company BRANSON developed in the field of friction welding a plastic welding device, the lower tool of which is arbitrarily movable on the lifting table in the space, especially along a control line. A movement of the upper tool is not possible due to the forces occurring at the vibration welding or friction welding and thus not envisaged.

However, this known plastic welding device comprises no preheating arrangement. Further, all tools arranged on the lifting table move equally, thus especially in the same direction. This can be illustrated by means of the example of a sliding table which is arranged on the lifting table. While the lifting table allows a movement along the vertical axis, the sliding table allows a movement along the axis within the x,y-plane. In practice, the sliding table allows with respect to an opening of the plastic welding device simultaneous movement forward, thus in the direction of the user, or backwards, and thus away from the user, for all tools arranged thereon. Such a controlling of the tool requires at least three drives, one for the vertical direction and two for the movement in the plane. Further, the coordinated controlling of the respective drives is complex which makes the controlling overall costly.

Further, the known plastic welding device is not suitable for the usage in welding two components to each other which are arranged mirror-symmetrical on the lower tool. The usage of the known device would especially during the simultaneous welding of two mirror-symmetrically arranged components with complex protrusions or undercuts further lead to the damaging or destruction of at least one of the components and/or the preheating arrangement or at least a preheating device of the preheating arrangement as both tools are always moved in the same direction.

At least some implementations of a plastic welding device enable components with complex undercuts to be welded easily and quickly. Further, a respective plastic welding method is provided.

SUMMARY

This disclosure relates generally to a plastic welding device as well as a plastic welding method. Further preferred embodiments result from the following description, the drawings as well as the appended claims.

The inventive plastic welding device comprises a first tool which is arranged at a first support, and a second tool which is arranged at a second support, wherein the first tool is movable by a first drive with respect to the first support into a first direction linearly between a first position and a second position while an origin of a first imaginary spherical coordinate system is arranged in the first position, preferably at the first tool, wherein the z-axis extends as a first z-axis into the direction of the second support and for a first inclination angle between the first z-axis which is positive in the direction of the second support, and the first direction it applies $0 \leq \upsilon_1 \leq \pi/2$, whereby a first component at the first tool is engageable with a second component at the second tool.

At least one implementation of a plastic welding device is described in the following for a better understanding during operation. For the exemplary operation, the first support is a lifting table and the second support is an upper mounting plate. Thus, the first tool is a lower tool and the second tool is an upper tool.

Further, a first component is for example a housing in which a mounting part is arranged, for example clipped or snapped in. This mounting part has one or several protrusions which, when the first component is viewed from the top side, protrudes beyond an edge of the first component. However, as the edge belongs to the joining portion, a second component must be engageable therewith. This is realizable by means of the plastic welding device as will be illustrated in the following.

As usual, at first a first component is arranged on or at, which is used herein synonymously, the first tool, thus for example on the lower tool. Preferably, the first tool is here in the first position. In this first position, the first tool is arranged at the first support, i.e. especially directly adjacent to the first support. For simplification reasons it is assumed that the second component is already arranged in the second tool.

For bringing now the first component into engagement with the second component, the first tool is moved from the first position into the second position. This takes place preferably by means of only one first drive linearly along the first direction. As already described above, in the first position the first tool is arranged adjacent to the first support. In the second position, the first tool has a distance to the first support which is larger than the distance in the first position. The first direction is defined by the first inclination angle between the first z-axis and the first direction. The origin of the first imaginary spherical coordinate system is arranged at the first tool in the first position, wherein the z-axis extends as a first z-axis in the direction of the second support having the second tool arranged thereon. For the first inclination angle it applies $0 \leq \upsilon_1 \leq \pi/2$. It is preferred that the first z-axis forms a normal to the x,y-plane. Further, in the imaginary spherical coordinate system preferably the x-axis as a first x-axis and the y-axis as a first y-axis enclose an angle of 90 degrees. According to a first embodiment, the first position lies within the x,y-plane. Especially, and assuming an x,y-plane of the first spherical coordinate system which extends preferably parallel to a surface of the first and/or the second support, it applies with respect to the first inclination angle preferably $0 < \upsilon_1 < \pi/2$. Thus, the first component can be brought into engagement with the second component in the second tool by linearly moving the first tool with respect to the first support along the first direction. Also, a rotation of the first tool for a specific rotation angle is realizable during the moving, wherein the rotation angle is defined between the first x-axis and a projection of the first direction onto the plane formed by the first x-axis and the first y-axis. Alternatively, the rotation angle is kept constant.

After the first tool has reached the second position and thus the first component is in engagement with the second component, a welding of the first and the second component to each other thus takes place. Finally, the first tool moves then back into the first position so that a user may remove the compound of welded first and second component welded to each other from the plastic welding device.

By means of the inventive plastic welding device, the first tool is thus moved diagonally or obliquely in space with respect to the first support. In this way, an engagement of the first component with the second component is realizable as along this direction of movement no undercut is present or an undercut is thereby avoided. An advantage of this inventive plastic welding device is thus also that only by means of one drive a diagonal or transverse movement of the first tool with respect to the first support is realizable which provides a respective simplification of the controlling and thus a cost reduction with respect to conventional plastic welding devices.

In a preferred embodiment, the plastic welding device is a friction welding device with preheating arrangement or an infrared welding device. Preferably, here the first and the second support are movable with respect to each other along the first z-axis. Again starting from the above initial conditions, i.e. the first component in the first tool and the second component already being arranged in the second tool, the following additional steps result during the operation of the inventive plastic welding device, the supports of which are movable with respect to each other.

In the beginning, the first support is arranged with respect to the second support in an initial position. In this initial position, for example, the loading of the first tool with the first component takes place by means of the user. A securing device which prevents a reaching of the user into the plastic welding device during the operation is at this moment not yet activated but will be activated upon starting the method. After starting, the first and the second support move with respect to each other from the initial position along the first z-axis in direction of each other into a first intermediate position.

As soon as this first intermediate position has been reached, the first tool is moved from the first position into the second position, as explained above. The first and the second support remain here in the first intermediate position, thus preferably do not vary their distance with respect to each other. Then, the welding of the first component to the second component takes place.

After the welding a moving of the first and the second support from the first intermediate position along the first axis away from each other and back into the initial position alternatively or additionally to the moving or displacing of the first tool from the second position into the first position takes place. Then, the securing device is deactivated and the user may remove the compound of first and second component.

If the plastic welding device comprises additionally the preferred preheating arrangement, then the following further steps are present. In the following, it is exemplarily assumed that the first component is arranged in the first tool and the second component is already arranged in the second tool. After starting the operation of the plastic welding device, the preheating arrangement is arranged between the first and the second tool adjacent to the first and the second component. Therefore, the preheating arrangement is for example moved from a neutral position preferably via an aligning position, wherein the preheating arrangement is arranged between the first and the second tool, into the preheating position. In a first embodiment, the preheating arrangement is therefore independently movable in the space, whereas the preheating arrangement is coupled in an alternative embodiment for example to the first or the second support. For supporting the adjacent arrangement of the preheating arrangement, optionally a moving of the first and the second support to each other is provided.

Now, preferably a preheating of the first and the second component in the portion to be welded occurs. After the preheating, the preheating arrangement between the first and the second tool is removed, especially back into a neutral position. Subsequently, the moving of the first and the second support towards each other as well as the above listed steps for welding take place.

In case a user should not arrange the second component directly in the second tool but arranges the second component on the first component in the first tool, preferably the following further steps are necessary due to the component geometry. First of all, the first tool is moved from the first position into the second position. Optionally, and prior to this, a moving of the first support with respect to the second support takes place into the intermediate position so that the first and the second tool are arranged in the correct distance with respect to each other.

After the first tool has been moved along the first direction to the second tool, the second component is delivered or transferred into the second tool. Thereafter, the first tool moves from the second position back into the first position. Now, preferably the above described steps with the preheating arrangement may follow. An advantage of this proceeding is that the second component has not to be arranged manually in the second tool. Thus, the usually difficult overhead-inserting of the second component and the disadvantageous ergonomical position of the user resulting therefrom can be avoided. Further, the positioning precision in the second tool is increased.

In a further preferred embodiment, the at least one first drive is connected with a first end to the first support and with a second end to a lifting-structure of the first tool. Due to the lifting structure, an equal force transmission from the first drive to the first tool during the moving with respect to the first support is made possible. Thus, a possible canting or tilting of the first tool is avoided very effectively.

In a further preferred embodiment, additionally the second tool is movable by means of a second drive, preferably only one second drive, with respect to the second support into a second direction linearly between a first position and a second position. An origin of an imaginary second spherical coordinate system is arranged at the second tool in the first position. The z-axis of the second imaginary spherical coordinate system extends as a second z-axis in the direction of the first support. For a second inclination angle between the second z-axis being positive in direction of the first support and the second direction it applies $0 \leq \upsilon_2 \leq \pi/2$.

In this way, the second tool is movable with respect to the second support analogously to the first tool, i.e. the above described movement procedures for the first tool from the first position to the second position are also performable for the second tool. The movement of the second tool takes place coordinated with the first tool, for example, prior to, after or at the same time with the moving of the first tool with respect to the first support.

It is preferred that the second z-axis forms a normal to the second x,y-plane. Further, in the imaginary second spherical coordinate system, preferably the x-axis as a second x-axis and the y-axis as a second y-axis enclose an angle of 90 degrees. According to a first embodiment, the first position lies within the second x,y-plane. For the second inclination angle of the second tool it applies, especially starting from a x,y-plane of the second spherical coordinate system which is parallel to a surface of the first and/or the second support, preferably a range of $0<\upsilon_2<\pi/2$. In a first embodiment, the first and the second inclination angle are different from each other. Hereby, further different component geometries can be bypassed or went around. It is also preferred to save movement time of the tools by means of the coordination of the first and the second drive with respect to each other. Thereby, preferably the overall cycle time for producing a connection is reduced. In a preferred special case or exception, and in case both tools shall be moved equally towards each other, the first and the second inclination angle are equal. It then applies $\upsilon_1=\upsilon_2$.

In the above described embodiment, in which the second tool is movable with respect to the second support, the device is preferably an infrared welding device. At this type of plastic welding device, no friction welding forces occur at the second tool, i.e. especially no vibrations. This allows the arranging of the second tool in a non-rigid manner at the second support.

In a further preferred embodiment, the plastic welding device comprises a third tool which is arranged at the first support as well as a fourth tool which is arranged at the second support. The third tool is movable by means of a third drive with respect to the first support into a third direction linearly between a first position and a second position. The third direction is preferably a mirroring or reflection of the first direction at a first mirror plane or reflection plane between the first and the third tool. For a first mirrored inclination angle between the first mirrored z-axis and the third direction with respect to the first inclination angle it thus applies $\upsilon_{1S}=\upsilon_1$. This applies analogously for the first mirrored rotation angle with respect to the first rotation angle. A movement of the third tool occurs prior to, after or at the same time with the moving of the first tool with respect to the first support.

Thus, two mirror symmetrical components, for example, a right and a left light for a motor vehicle can be welded simultaneously by means of this embodiment of the inventive plastic welding device, wherein only one drive for the diagonally movement of each tool in the space is necessary, respectively. Contrary to the common plastic welding devices, thus two mirror symmetrical components are processable with the embodiment of the plastic welding device at the same time. This results in a further respective cost and space benefit or advantage with respect to conventional plastic welding devices.

In a subsequent preferred embodiment, also the fourth tool is movable by means of a fourth drive with respect to the second support into a fourth direction linearly between a first position and a second position. The fourth direction is herein a mirroring of the second direction at a second mirroring plane between the second and the fourth tool. For a second mirrored inclination angle between the mirrored second z-axis and the fourth direction with respect to the second inclination angle it thus applies $\upsilon_{2S}=\upsilon_2$. Analogously, this applies also for the second mirrored rotation angle with respect to the second rotation angle.

Thus, all four tools are movable with respect to the respective support, wherein the first and the third tool as well as the second and the fourth tool move with respect to each other mirror symmetrically, respectively. This allows a maximum of flexibility during movement or moving of the tools with respect to the respective support so that the respective components can be brought into engagement with each other very effectively. Especially, more complex component geometries can be taken into account.

The inventive plastic welding method, especially by means of an inventive plastic welding device, has the following steps: arranging a first component on a first tool which is arranged on a first support of the plastic welding device and movable between a first position and a second position, wherein an origin of a first imaginary spherical coordinate system at the first tool is arranged in the first position, while the z-axis as a first z-axis extends in direction of the second support having a second tool arranged thereon, subsequently moving the first tool by means of a first drive with respect to the first support linearly along a first direction from the first position into the second position, wherein the first tool is arranged in the first position adjacent to the first support and it comprises in the second position a distance with respect to the first support which is larger than the distance in the first position, wherein for a first enclosed inclination angle between the first z-axis and the first direction it applies $0 \leq \upsilon_1 \leq \pi/2$, whereby the first component in the first tool is brought into engagement with a second component in the second tool. Thereafter, a welding of the first and the second component to each other occurs, for example by means of friction welding after preheating of the components or solely by means of pressing the components against each other after the preheating. With respect to the resulting advantages, it is referred to the above described embodiments of the inventive plastic welding device.

In a preferred embodiment, the plastic welding method comprises the further steps: moving the first and the second support from an initial position along the first axis towards each other into a first intermediate position prior to the moving of the first tool from the first position into the second position. Further, the method comprises the step of moving the first and the second support from the first intermediate position along the first axis away from each other into the initial position after the welding of the first and the second component to each other. Also in this regard, it is referred to the advantages described above in the description of the inventive plastic welding device.

In an also preferred embodiment, the plastic welding method comprises the further steps: arranging a second component on the first component in the first tool, moving the first tool from the first position into the second position, subsequently transferring the second component to the second tool and subsequently moving the first tool from the second position into the first position. In this way, the second component is arranged in the second tool, for example in the upper tool. A manual arranging of the second component in the upper tool is thus not required or necessary. This ensures a respectively precise or accurate aligning of the two components with respect to each other for the later welding procedure.

It is also preferred, if the plastic welding method comprises the further steps: arranging a preheating arrangement between the first and the second tool adjacent to the first and the second component, preheating the first and the second component in the portions to be welded and removing the preheating arrangement between the first and the second tool. In this way, a friction welding device with preheating arrangement or a sole infrared welding device is operable.

If the second tool is also movably arranged at the second support, then an origin of a second imaginary spherical coordinate system is arranged at the second tool in a first position. A second z-axis extends thus in the direction of the first support and the plastic welding method comprises the further step: moving the second tool by means of a second drive relative to the second support linearly into a second direction between a first position and a second position, wherein for a second inclination angle between the second z-axis being positive in the direction of the first support and the second direction it applies $0 \leq \upsilon_2 \leq \pi/2$.

The direction of movement of one or both, the third and the fourth tool, if present, is mirror symmetrical with respect to the first or the second tool, respectively. Thus, for a third direction of movement, it applies that it is mirror symmetrical to the first direction and for the fourth direction it applies that it is mirror symmetrical to the second direction. Accordingly, the inclination angle at the mirrored axis of the mirrored spherical coordinate systems are equal to the original or initial inclination angles as well as the mirrored rotation angles are equal to the original rotation angles. The plastic welding method comprises thus advantageously the step of: moving the third tool by means of a third drive with respect to the first support along a third direction from a first position into a second position, wherein the third direction corresponds to a mirroring of the first direction at a first mirror plane between the first and the third tool. Further preferred, the plastic welding method comprises the step: moving the fourth tool by means of a fourth drive with respect to the second support along a fourth direction from a first position into a second position, wherein the fourth direction corresponds to a mirroring of the second direction at a second mirror plane between the second and the fourth tool.

BRIEF DESCRIPTION OF THE DRAWINGS

In the following, certain embodiments of the present invention are described in detail with respect to the accompanying drawings. In the figures, the same components are characterized by the same references signs. It shows.

DETAILED DESCRIPTION OF PREFERRED EMBODIMENTS

Figure 1:
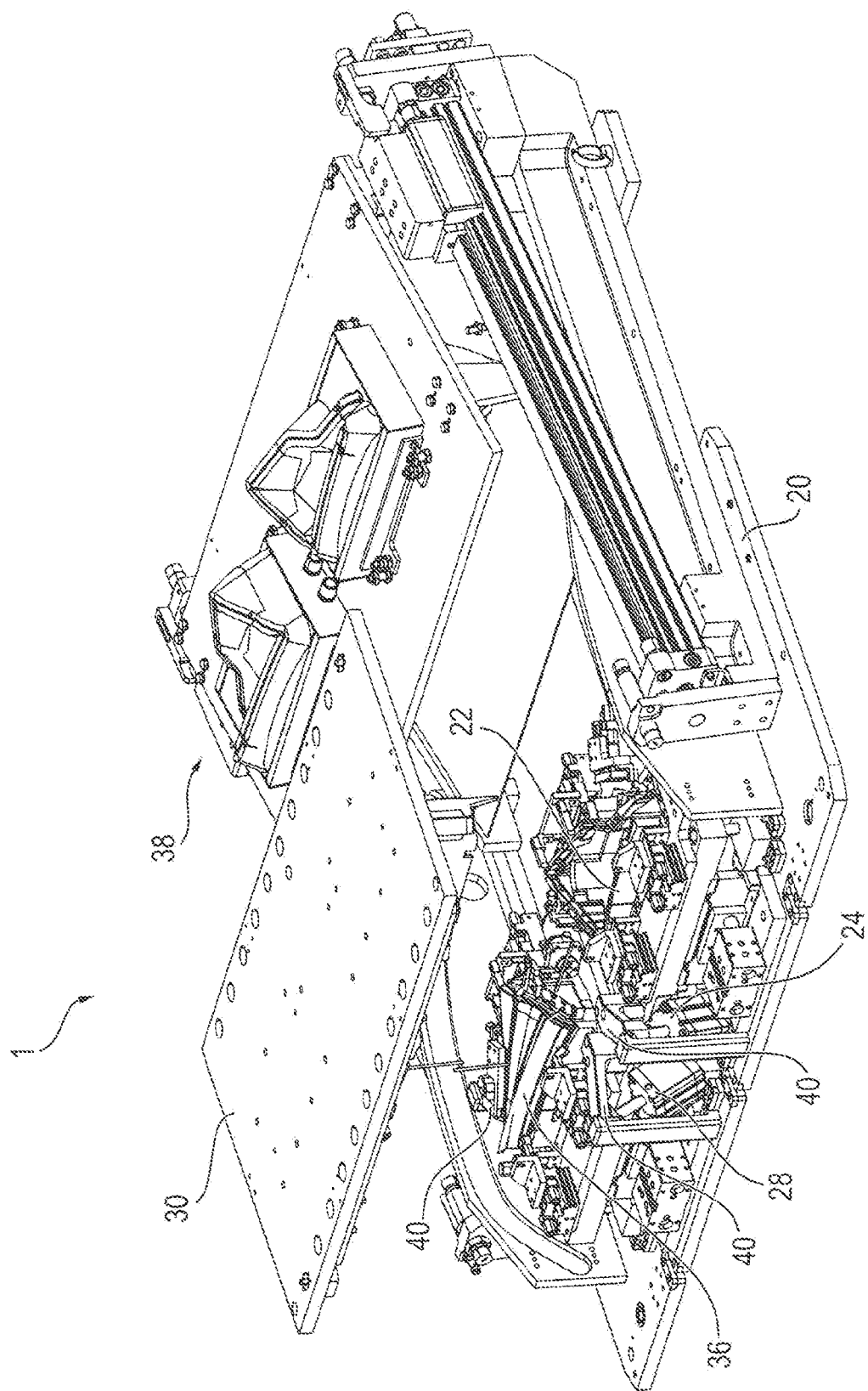
FIG. 1 a perspective view of a preferred embodiment of the inventive plastic welding device, FIG. 2 an exemplary component, FIG. 3 a detailed view of a portion of the component of FIG. 2, FIG. 4 a schematic cross-sectional view of the component of FIG. 2 in combination with a preferred preheating device, FIG. 5 a schematic view of a first preferred embodiment of an inventive plastic welding device, FIG. 6 a schematic depiction of a second preferred embodiment of the inventive plastic welding device, FIG. 7 a front side view of a third preferred embodiment of the inventive plastic welding device, FIG. 8 a perspective view of the embodiment of FIG. 7, FIG. 9 a schematic depiction of the embodiment of FIG. 7 in a first position, FIG. 10 a schematic depiction of the embodiment of FIG. 7 in a second position, FIG. 11 a schematic depiction of a fourth preferred embodiment of the inventive plastic welding device as well as FIG. 12 a schematic course of procedure of a preferred embodiment of an inventive plastic welding method.

An embodiment of the inventive plastic welding device 1 is shown in FIG. 1. The plastic welding device 1 is usable for the welding of components or component groups which consist of plastic or comprise plastic. Here, the plastic welding device 1 may be used in the automotive industry, for example for producing lights, as well as in the medical technology or in the production of consumer goods. The plastic welding device 1 comprises a first support 20 and a second support 30. At the first support 20, a first 22 as well as a third tool 26 are arranged. At the second support 30, a second tool 32 as well as a fourth tool 34 are arranged. Further, the plastic welding device 1 comprises a preheating arrangement 38 with four preheating devices in total. The preheating arrangement 38 is coupled to the first support 20 and movable by means of a motion link guide between a neutral position and an aligning position. In the aligning position, the preheating arrangement is arranged between the first 20 and the second support 30.

Figure 2:
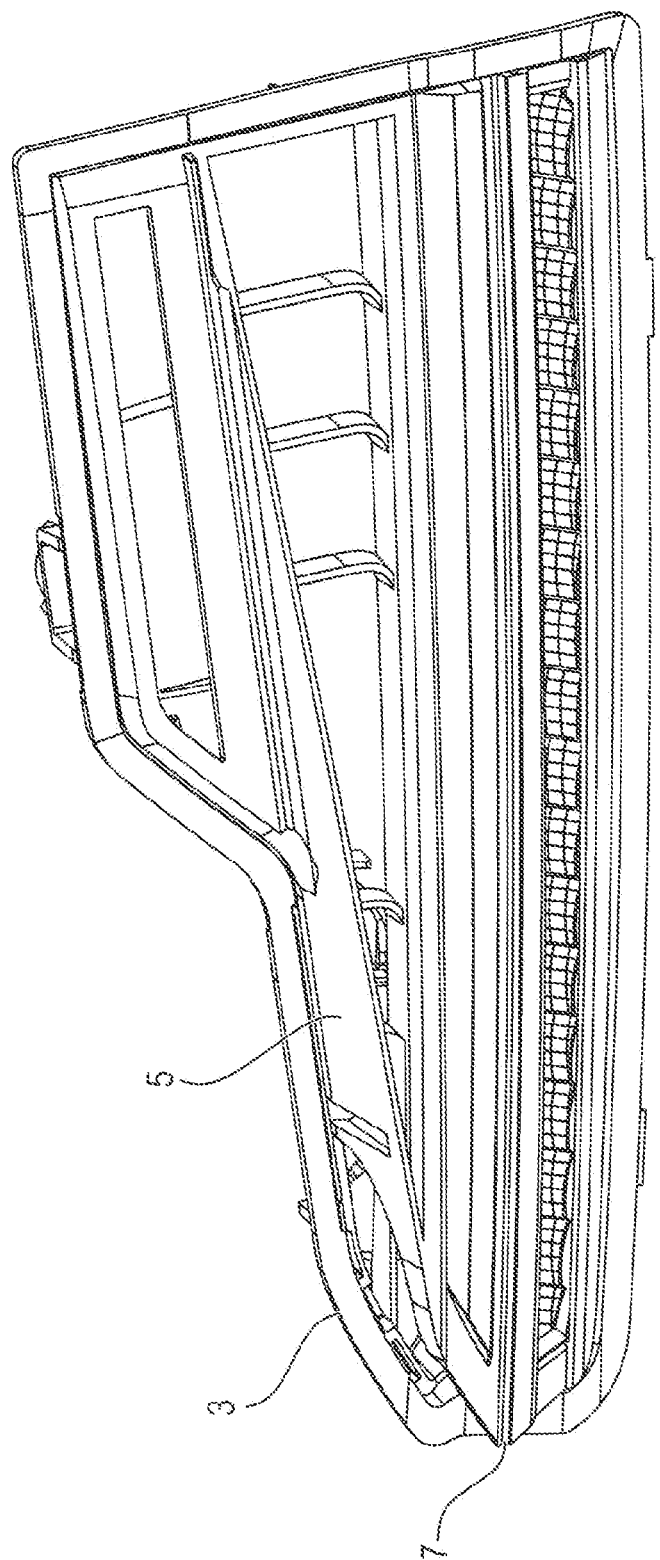
Figure 3:
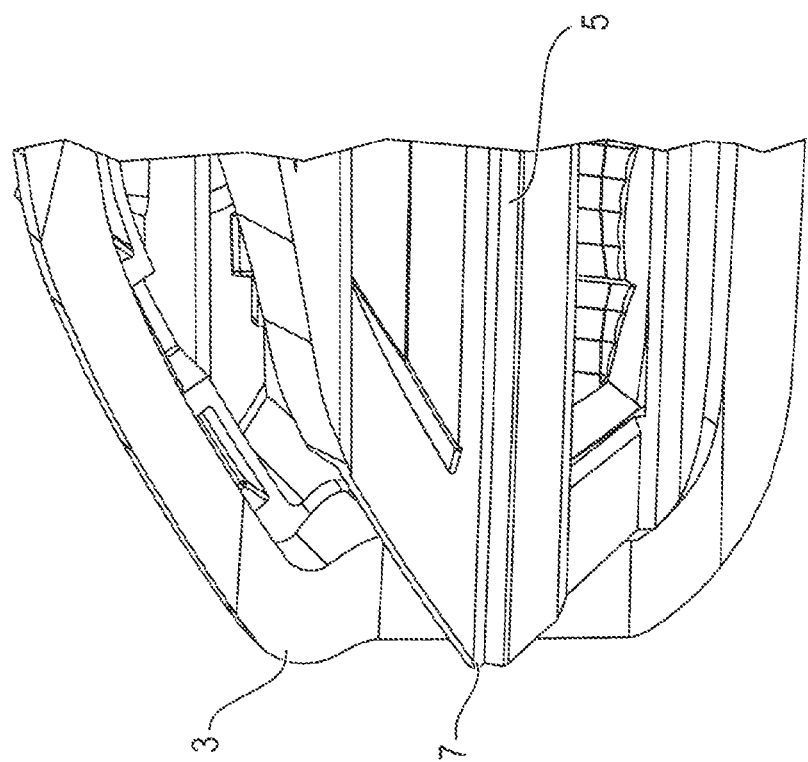

An exemplary component 3 is shown in FIGS. 2 and 3. FIG. 3 shows a section of the left portion of FIG. 2. In component 3, a mounting part 5 is arranged. The mounting part 5 is preferably snapped in, clipped in or welded into the component 3 and comprises a protrusion or projection 7 beyond a joining portion of the component 3. Alternatively, the component 3 comprises an element itself which is a protrusion in the angular position required for the friction welding.

During the later usage of component 3, a further component is fastened at the component 3, which is especially a housing, wherein for example and with respect to the production of lights in the automotive industry the further component is a cover glass. As can be seen from FIGS. 1 and 2, a vertical placing, i.e. a placing from the top, of the further component onto the component 3 is not possible due to the projection 7 of the mounting part 5. Thus, a common plastic welding device is unfit to weld the component 3 to the further component, especially not by using a prior preheating process by means of a preheating arrangement. This is explained in the following with respect to FIG. 4.

Figure 4:
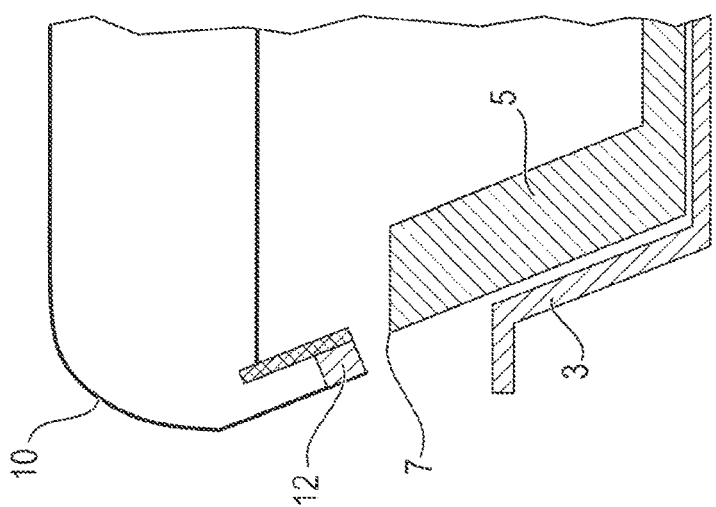

In FIG. 4, the component 3 with the mounting part 5 is shown in combination with a preheating device 10 having an infrared radiator 12. Here it is again illustrated that a sole movement of the component 3 to the top in the direction of the preheating arrangement 10 would lead to the collision of the infrared radiator 12 with the mounting part 5. This collision would in turn lead to the damaging and/or destruction of the mounting part 5 and/or of the infrared radiator 12. Therefore, a part having such a design is not weldable to the second component solely by means of a movement along the vertical axis.

The projection 7 is characterized in that it occurs due to the angular position of the two components which is required during the friction welding. At common plastic welding devices, the first and the second tool can only be moved along a vertical axis with respect to the ground on which the plastic welding device is placed. Thus, the projection 7 is a position which may lead during a movement of the first and the second tool with respect to each other along the vertical axis to a damaging of one of the components and/or one of the tools.

Figure 5:
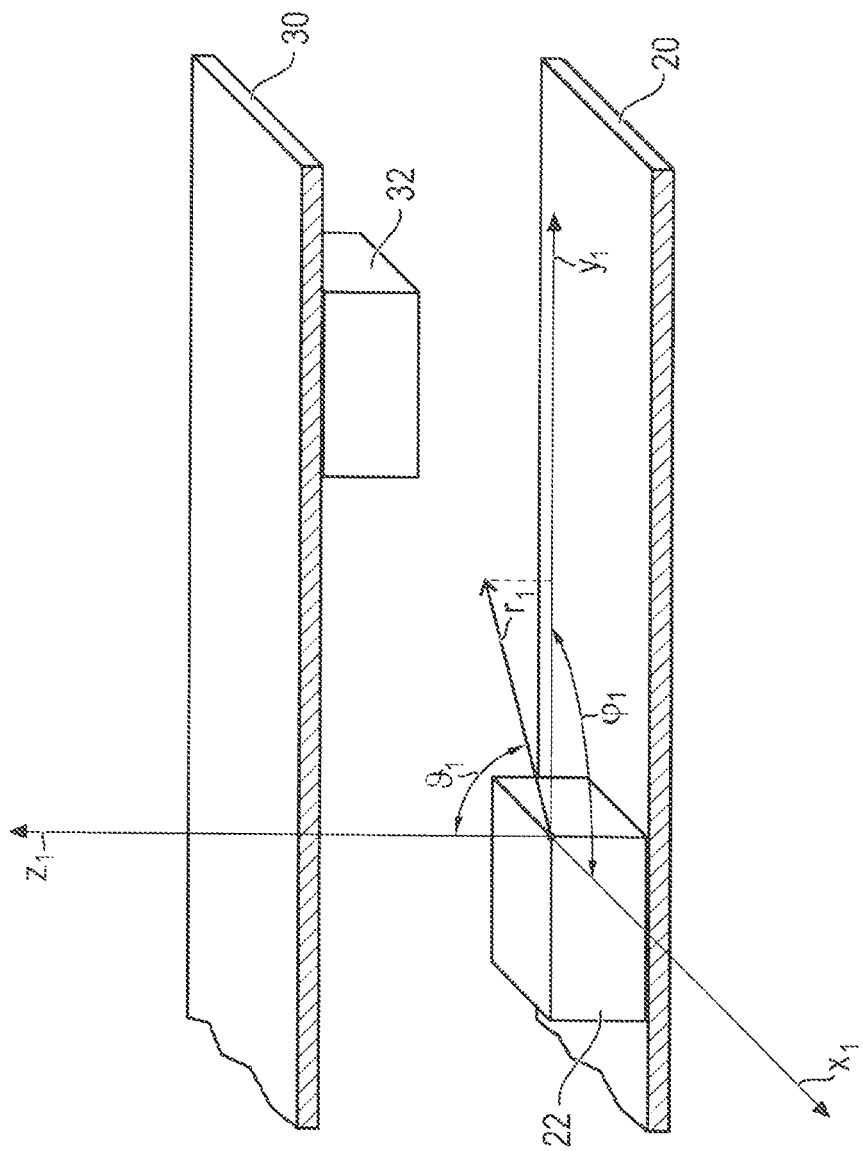

FIG. 5 shows now a schematic depiction of a first embodiment of the inventive plastic welding device 1. The inventive plastic welding device 1 comprises a first support 20 as well as a second support 30. On the first support 20, a first tool 22 is arranged and on the second support 30, a second tool 32 is arranged. The first tool 22 is movable by means of a first drive relative to the first support 20 linearly in a first direction $r_1$. This means that the first tool 22 can take a first position in which it is arranged at the first support 20, as well as a second position in which it is moved away from the first support 20, i.e. it has a larger distance to the first support 20 than in the first position.

As can be seen from FIG. 5, the first tool 22 and the second tool 32 are arranged on the respective support 20, 30 not vertically above each other but laterally displaced with respect to each other. An origin of a first imaginary spherical coordinate system is for example arranged in the first position of the first tool 22. In the origin, the values of all axes are zero so that the origin may also be referred to as neutral point or zero point. The z-axis as a first z-axis $z_1$ extends in the direction of the second support 30. In the shown embodiment, the two supports are arranged above each other and the x,y-plane extends for reasons of clarity parallel to a surface of the first support 20 and the second support 30. It can be seen that the first z-axis $z_1$ forms a normal with respect to the x,y-plane. Between the x-axis as a first x-axis $x_1$ and the y-axis as first y-axis $y_1$, an angle of 90 degrees is enclosed. Further, the first y-axis $y_1$ extends also for reasons of clarity in the direction of the second tool 32. As the spherical coordinate system is right-handed or dextral, the orientation of the first x-axis $x_1$ results on its own. The dexterity of the spherical coordinate system is defined in that a rotation of one of the axes around the common coordinate origin to the next axis in the alphabetical sequence until an overlapping occurs is performed on the shortest way counterclockwise.

In FIG. 5, the origin of the coordinate system has been arranged on the right edge of the first tool 22. For connecting the first component on the first tool 22 with the second component on the second tool 32, the two tools 22, 32 have to be moved towards each other. For example and for clarification of the functioning, it is assumed that the surfaces of the tools 22, 32 have to be arranged above each other. Starting from the origin of the first spherical coordinate system at the right edge of the first tool 22, the right edge of the first tool 22 thus has to be aligned with the right edge of the second tool 32. The resulting first direction $r_1$ is schematically shown by an arrow.

The first direction $r_1$ is defined by a first inclination angle $\upsilon_1$ between the first z-axis $z_1$ which is positive in the direction of the second support and the first direction $r_1$. In the present example in which the x,y-plane is parallel to a surface of the first 20 and/or the second support 30, it applies $0<\upsilon_1<\pi/2$. The value of the first inclination angle $\upsilon_1=0$ would lead to a movement along the first z-axis. Due to the above explained projection 7 and the problems resulting therefrom, especially this movement is not desired. The value of the first inclination angle with $\upsilon1=\pi/2$ would lead to a movement within the x,y-plane. This is also not desired as the distance between the first 20 and the second support 30 is preferably kept constant during a movement of the first tool 22. Thus, in this case it would not come to an engagement of the first component with the second component. Hereby, it has to be especially stressed that particularly no drive is provided for a movement within the x,y-plane. To the contrary, the first drive is oriented such that a movement of the first tool 22 along the first direction $r_1$ occurs solely due to the first drive.

Besides the first inclination angle $\upsilon_1$, the first direction $r_1$ is further defined by a first rotation angle $\varphi_1$. The first rotation angle $\varphi_1$ results from the angle between the first x-axis $x_1$ and the projection of the first direction $r_1$ onto a plane formed by the first x-axis $x_1$ and the first y-axis $y_1$. In the present case, in which the first y-axis $y_1$ extends in the direction of the second tool 32, a first rotation angle $\varphi_1$ of $\varphi_1=\pi/2$ results.

Figure 6:
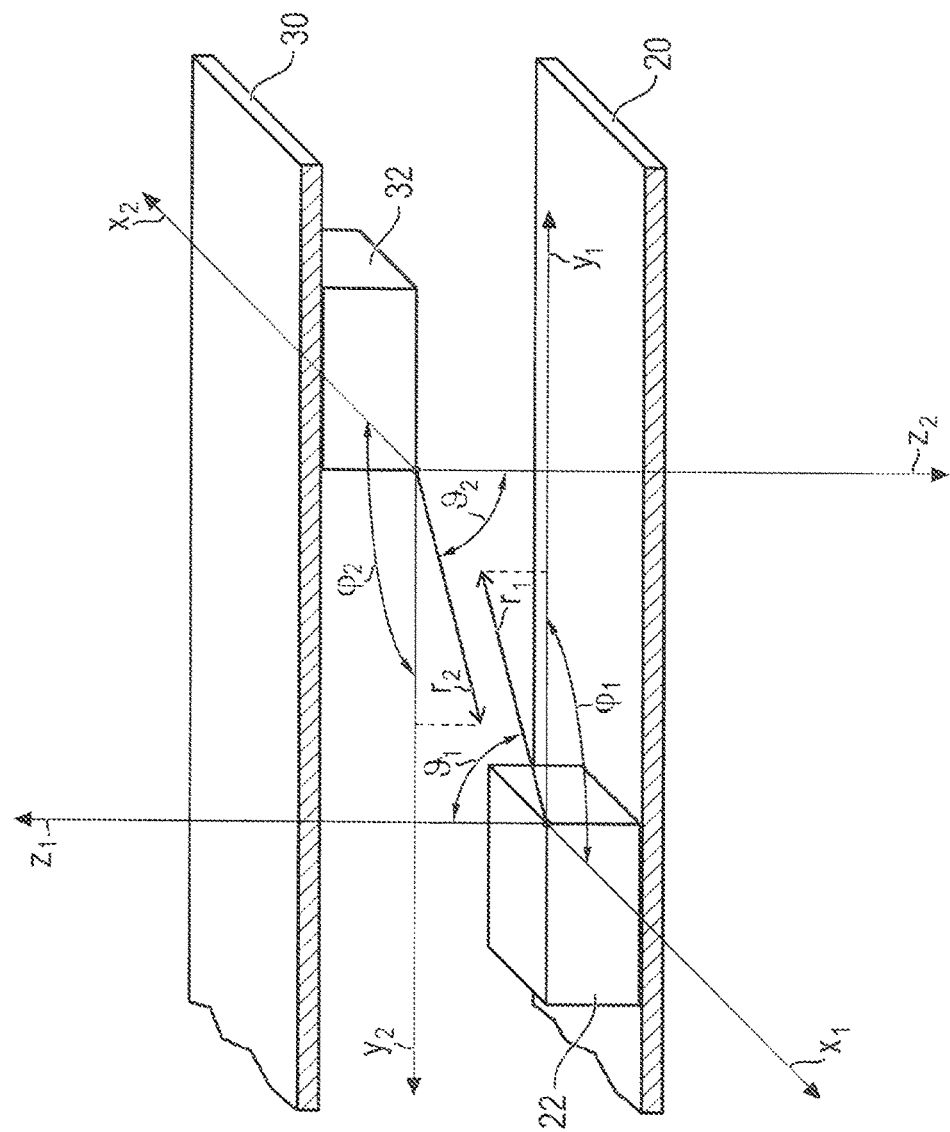

FIG. 6 shows a second embodiment of the inventive plastic welding device 1. In this embodiment, besides the first tool 22 also the second tool 32 is movable with respect to the second support 30. The origin of an imaginary second spherical coordinate system is arranged here at the second tool 32. In the shown example, the origin is arranged at the left edge of the second tool 32. In the embodiment according to FIG. 6, both tools are exemplarily movable along the same path towards each other. Due to this, the first direction $r_1$ and the second direction $r_2$ extend parallel but in opposite directions. In this special case, the first $\upsilon_1$ and the second inclination angle $\upsilon_2$ are equal. This applies also to the first $\varphi_1$ and the second rotation angle $\varphi_2$. Also other types of movement are possible, especially the first $\upsilon_1$ and the second inclination angle $\upsilon_2$ of the two movement directions can be different from each other. The value of the first $\upsilon_1$ and the second inclination angle $\upsilon_2$ depend especially here from the shape of the components to be brought into engagement with each other.

Figure 7:
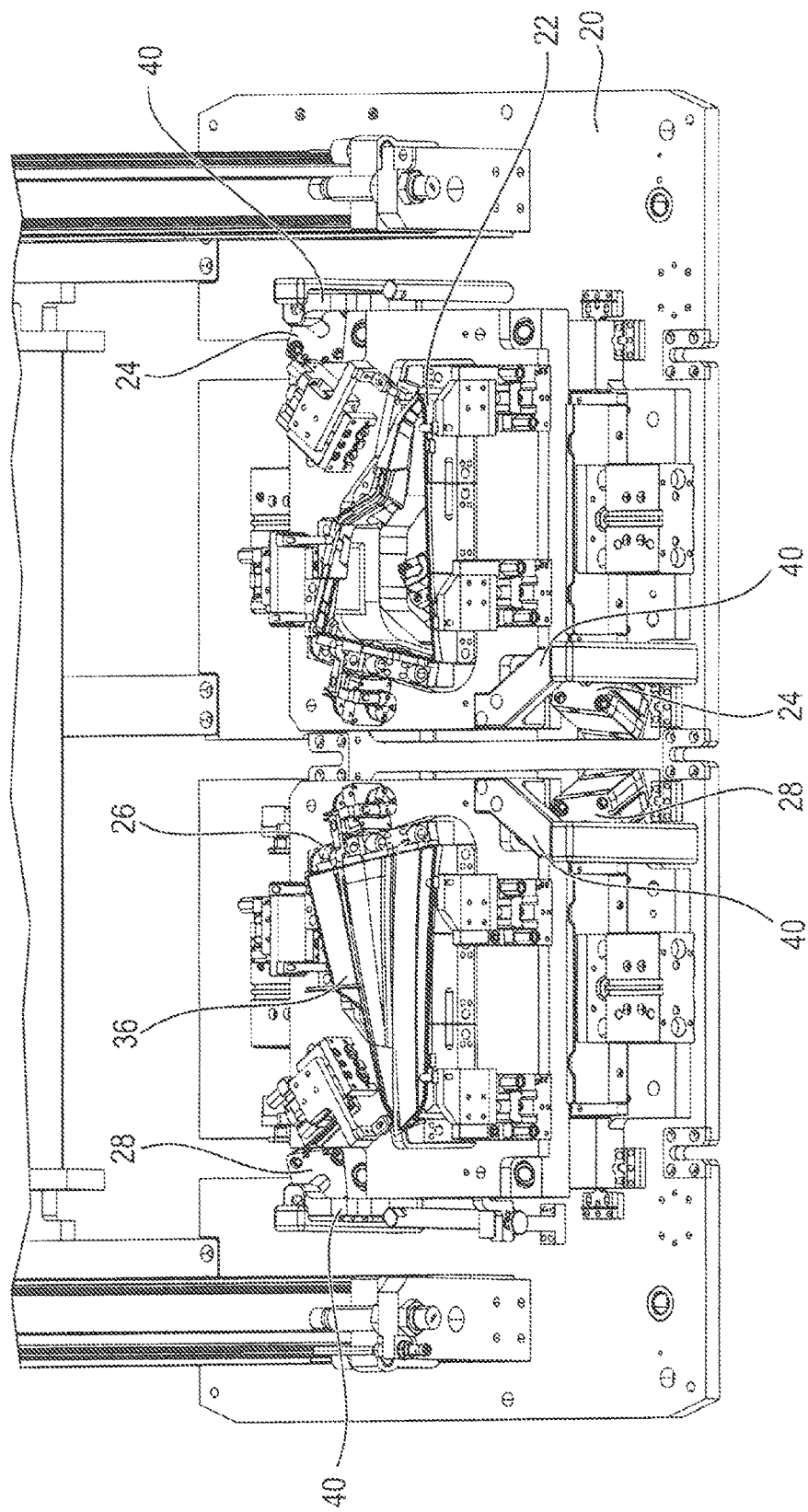
Figure 8:
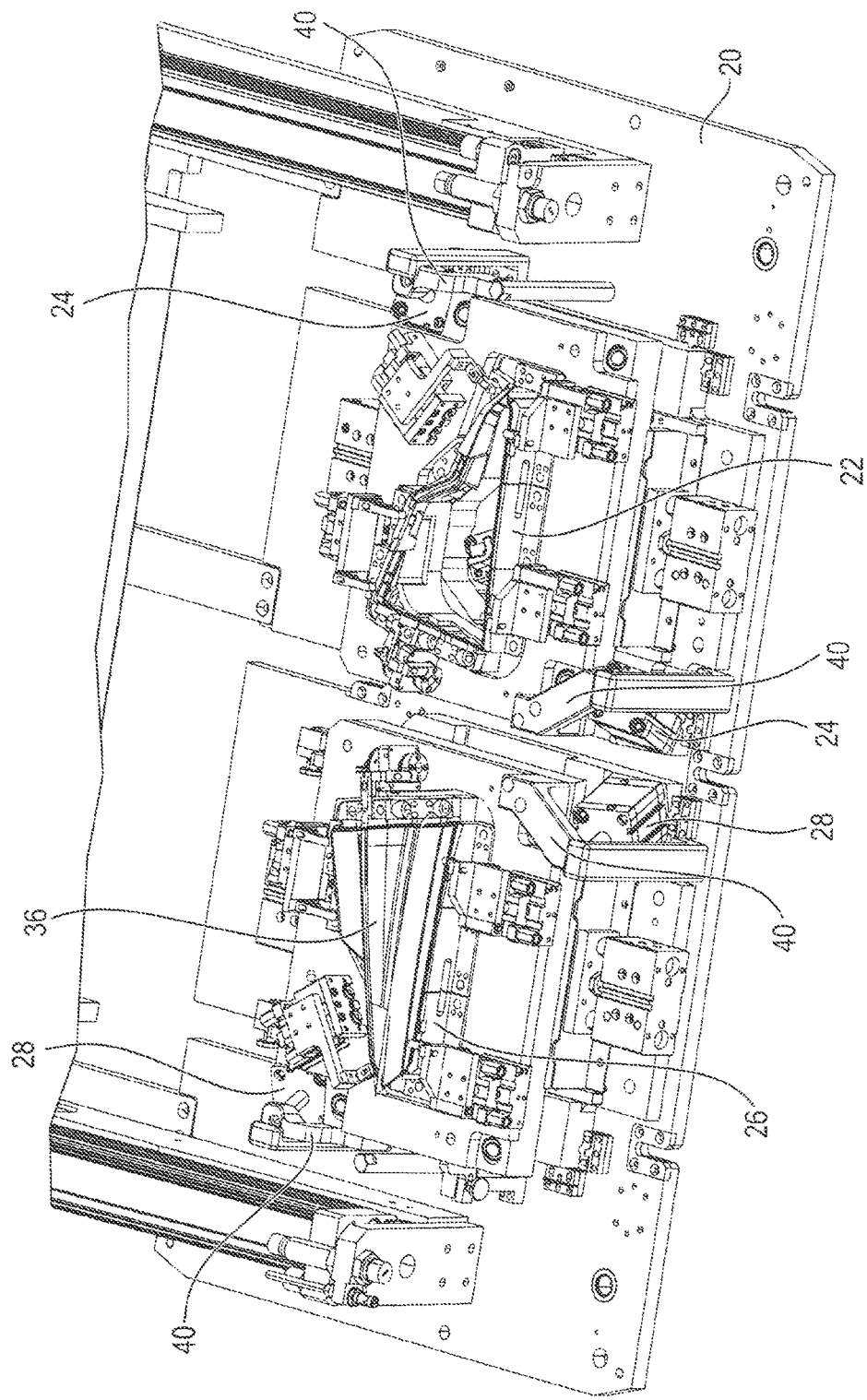

FIG. 7 shows now a third embodiment of the inventive plastic welding device 1. Here, the first support 20 comprises further a third tool 26. Furthermore, the first drive 24 for the first tool 22 as well as the third drive 28 for the third tool 26 are depicted. The drives 24, 28 are connected with one end to the first support and with the other end to a lifting structure 40. By means of the lifting structure 40, the first tool 22 or the third tool 26, respectively, is moved by means of the respective drive 24, 28 with respect to the first support 20 in the first direction $r_1$ or in the third direction of $r_3$, respectively. The corresponding arrangement is shown in FIG. 8 in a perspective view.

Figure 9:
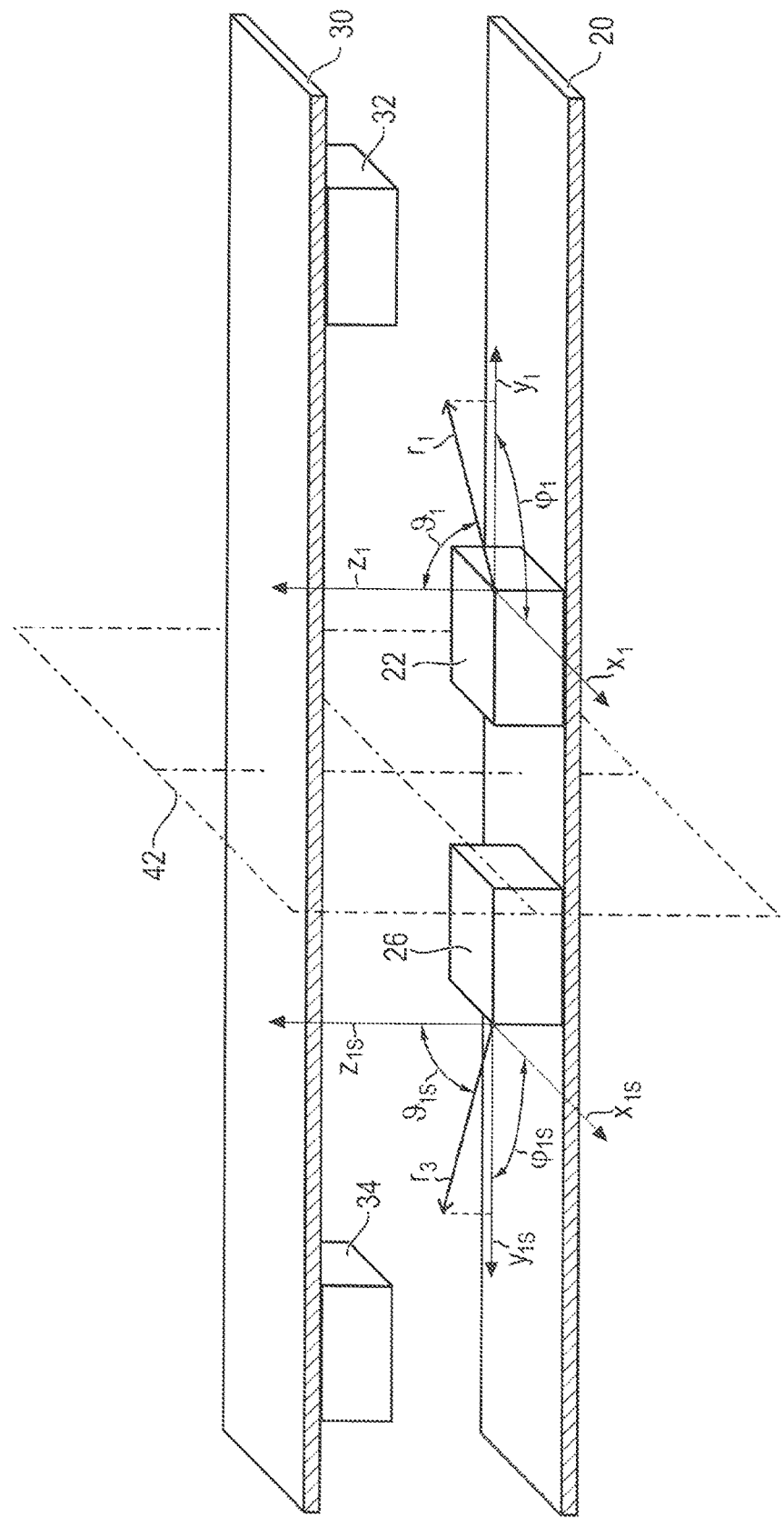

Now with reference to FIG. 9, the functioning is shown schematically. The tools 22, 26 are mirror symmetrical tools. In this way, two mirror symmetrical components can be processed at the same time. Therefore, for example a right and a left light may be processed or manufactured in the plastic welding device at the same time.

Between the first tool 22 and the third tool 26, a first mirror plane or reflection plane 42 extends parallel to the first z-axis $z_1$, preferably central with respect to the first position of both tools 22, 26. The third direction $r_3$ is thus a mirroring of the first direction $r_1$ at this first mirror plane. The same applies for the respective first mirrored spherical coordinate system.

As can be seen from FIG. 9, the first spherical coordinate system on the right side is a right-handed or dextral spherical coordinate system. Accordingly, the imaginary spherical coordinate system on the left side, thus the mirroring, is a left-handed or sinistral spherical coordinate system. For the first mirrored inclination angle $\upsilon_{1S}$ it applies with respect to the first inclination angle $\upsilon_1$ that $\upsilon_{1S}=\upsilon_1$. The analogue requirements apply for the first mirrored rotation angle $\varphi_{1S}$ with respect to the first rotation angle $\varphi_1$ so that it applies: $\varphi_1=\varphi_{1S}$.

Figure 10:
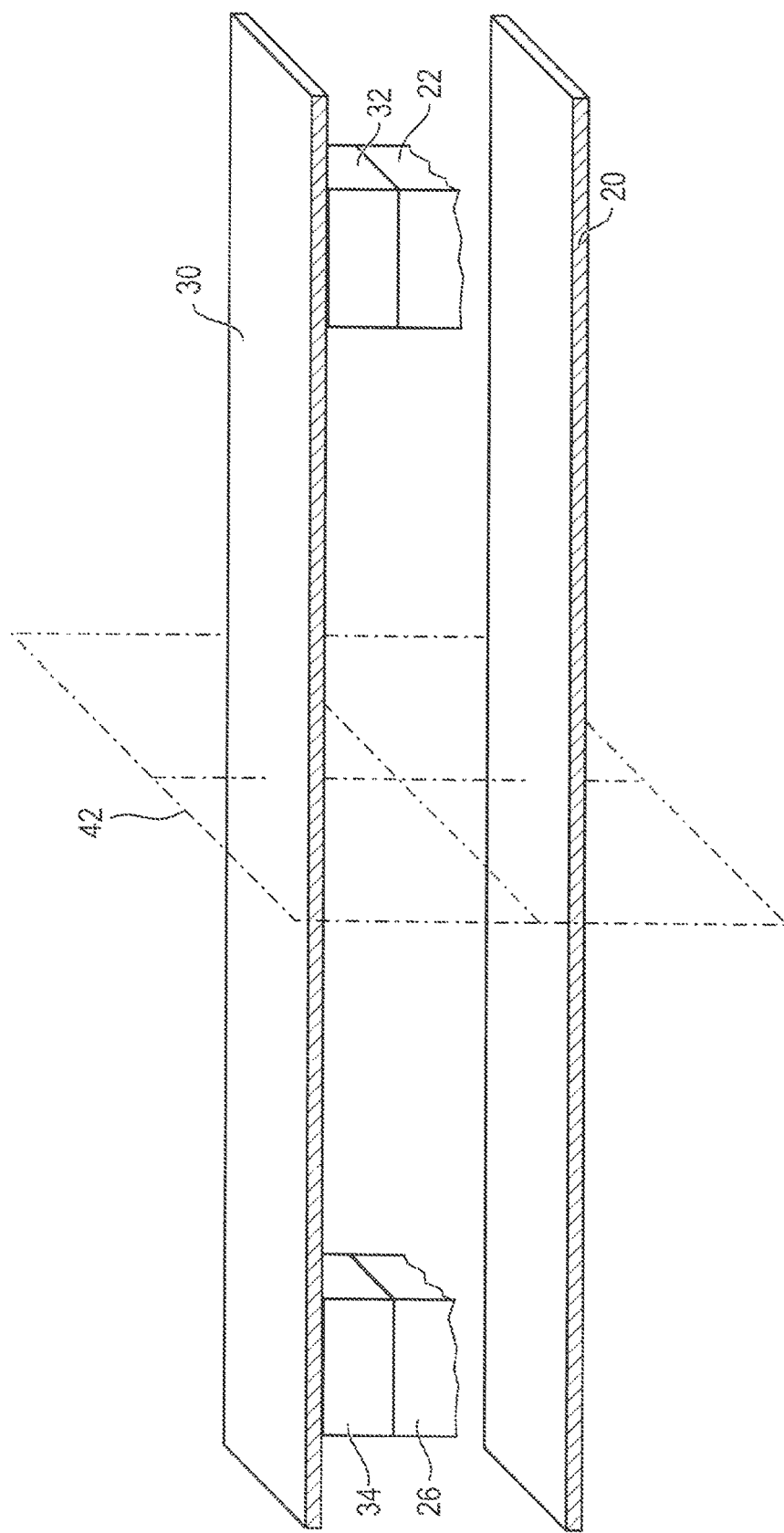

FIG. 10 shows the first 22 and the third tool 26 after the moving from the first position into the second position. Herein, the first tool 22 is arranged adjacent the second tool 32 so that a first component is in engagement with a second component. Further, the third tool 26 is arranged adjacent to the fourth tool 34 so that a third component is in engagement with a fourth component.

Figure 11:
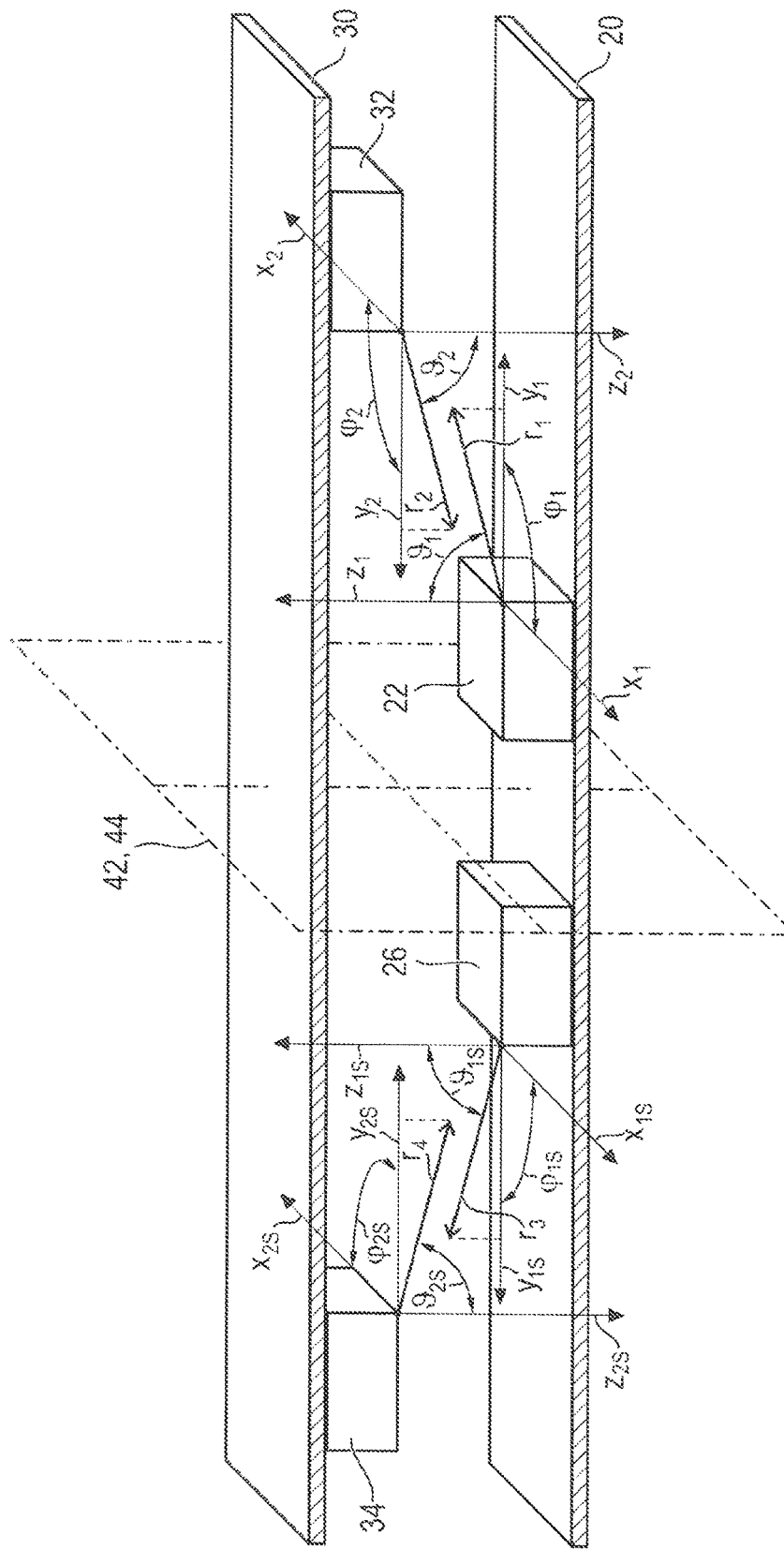

In FIG. 11, now a fourth embodiment is shown in which all four tools 22, 26, 32 and 34 are movable with respect to their respective support 20, 30. Herein, the movement of the second tool 32 is mirrored at a second mirror plane 44 and results in the movement of the fourth tool 34. Accordingly, the fourth direction $r_4$ is a mirroring of the second direction $r_2$. The second imaginary spherical coordinate system in the second tool 32 is a right-handed or dextral spherical coordinate system, if viewed from the second support 30. Accordingly, the imaginary fourth spherical coordinate system as mirroring of the second imaginary spherical coordinate system is a sinistral or left-handed spherical coordinate system.

Figure 12:
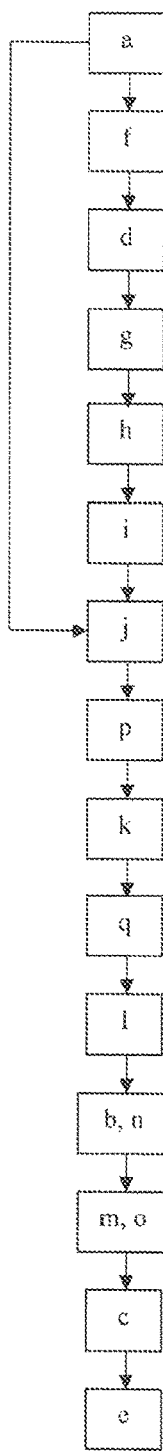

A schematic course of procedure of the inventively preferred plastic welding method is shown in FIG. 12. The plastic welding device is overall in an initial position. This means that the first and the second support have an initial position wherein the distance between the first and the second support for loading the plastic welding device is sufficient. Further, the tools, as far as they are arranged movable on the support, are in a first position.

Now, a user arranges a first component on the first tool 22 in step a. Further, in step f a second component is arranged on the first component in the first tool 22. With the two components, the first support 20 is moved in the direction of the second support 30 into a first intermediate position (step d). From this intermediate position, a moving of at least the first tool 22 from the first position into the second position occurs (step g). If the third tool 26 is present, it moves analogously to the first tool 22. Herein, analogously means that it performs the same step, but this must not occur at the same time with the first tool 22 but can also occur prior to this or thereafter. The same applies in case that the second 32 and/or the fourth tool 34 are movable between a first and a second position.

After all movable tools 22, 26, 32, 34 reached the second position, a transferring of the second and/or fourth component to the second tool 32 or fourth tool 34, respectively, takes place in step h. Subsequently, the movable tools 22, 26, 32, 34 are moved from the second position linearly back into the first position along the respective direction $r_1$, $r_2$, $r_3$, $r_4$ (step i). The first 20 and the second support 30 move now into an uptake position for the preheating arrangement 38. As an alternative to the above steps, the user may also arrange the second and/or fourth component directly in the second 32 or fourth tool 34, respectively.

In step j, the preheating arrangement 38 of the plastic welding device 1 is arranged between the first 22 and the second tool 32 adjacent to the first and the second component. This applies, as far as present, also for the third 26 and the fourth tool 34. The first 20 and the second support 30 are here in the uptake position. For example, the preheating arrangement 38 moves therefore from a neutral position first of all into an aligning position between the first 20 and the second support 30 in the uptake position. From the aligning position, the preheating arrangement 38 is moved then into a preheating position adjacent to the respective components. To this end, the preheating arrangement 38 may be movable independently in the space, or it is for example coupled to the first support 20 by means of a motion link guide. Depending on the distance between the components in the tools 22, 26, 32, 34 and the respective preheating device 38, the distance between the first 20 and the second support 30 is reduced before the movable tools 22, 26, 32, 34 are moved from the first position into the second position for the preheating of the components (step p).

Then in step k, a preheating of the components takes place in the portions to be welded. After sufficient preheating, in step l the preheating arrangement 38 between the first 22 and the second tool 32 and, if present, the third 26 and the fourth tool 34, is removed. The removing occurs in the opposite sequence, i.e. the movable tools 22, 26, 32, 34 are moved first of all from the second position back into the first position (step q) and, if required, the distance between the first support 20 and the second support 30 is again increased. Thereafter, the preheating arrangement 38 is moved into the aligning position and subsequently into the neutral position.

After the preheating, the first support 20 and the second support 30 are moved into the first intermediate position (step d). The first tool 22 is arranged in the first position and is moved for welding the first component to the second component into the second position along the first direction $r_1$ (step b). The same applies for the third tool 26 in connection with the fourth tool 34 (step n), as far as present. Additionally may, if the second 32 and the fourth tool 34 are also movable, occur a movement of the second 32 and the fourth tool 34 (steps m and o). The first 20 and the second support 30 are here in the first intermediate position. Dependent on the components to be welded, a so-called residual lifting occurs after the movement of the respective support 20, 30 in which the distance between the first 20 and the second support 30 is reduced in a small portion for bringing the respective components into abutment. Alternatively to this, the first 20 and the second support 30 do not change their position after the movement of the tools 22, 26, 32, 34 with respect to the respective support 20, 30. This serves respectively for applying the welding force.

As soon as the first component is in engagement with the second component and the third component is in engagement with the fourth component, the welding of the two components to each other takes place in step c. Here it has to be considered that the welding by means of friction welding is preferred, if the second 32 and the fourth tool 34 are arranged rigidly at the second support 30. Otherwise, the occurring friction welding forces would lead to a damaging of the second 32 and/or fourth tool 34. Therefore, the additional movability of the second 32 and the fourth tool 34 is only useful when using an infrared welding device.

After the welding of the first and the second component as well as, if present, the third and the fourth component, the first 20 and the second support 30 are moved from the intermediate position along the first z-axis $z_1$ away from each other into the initial position. In this position, the user may now remove the components connected to each other easily. The removing or unloading occurs here preferably from the tools 22, 26 at the first support 20. Alternatively, the unloading occurs from the tools 32, 34 at the upper support 30. Also, a combination thereof is possible.

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention.

The invention claimed is:

1. A plastic welding device, comprising:
   a. a first tool which is arranged at a first support, and
   b. a second tool which is arranged at a second support, wherein
   c. the first tool is movable by means of a first drive with respect to the first support in a first direction linearly between a first position and a second position wherein the first direction is inclined with respect to the first support along a first inclination angle $\upsilon_1$, while
   d. an origin of a first imaginary spherical coordinate system is arranged in the first position, wherein the z-axis as a first z-axis extends in the direction of the second support, and
   e. the first inclination angle $\upsilon_1$ is defined between the the first direction and the first z-axis, which is positive in the direction of the second support, and the first inclination angle $\upsilon_1$ is between 0 and $\pi/2$, whereby a first component at the first tool can be brought into engagement with a second component at the second tool.

2. The plastic welding device according to claim 1, wherein the plastic welding device is a friction welding device with preheating arrangement or an infrared welding device.

3. The plastic welding device according to claim 2, wherein the first and the second support are movable with respect to each other along the first z-axis.

4. The plastic welding device according to claim 2, wherein the at least one first drive is connected at a first end to the first support and with a second end to a lifting structure of the first tool.

5. The plastic welding device according to claim 2, wherein the first support is a lifting table and the second support is an upper mounting plate.

6. The plastic welding device according to claim 5, in which the second tool is movable by means of a second drive with respect to the second support in a second direction linearly between a first position and a second position, wherein an origin of a second imaginary spherical coordinate system is arranged in the first position, while the z-axis as a second z-axis extends in the direction of the first support, and
   for a second inclination angle between the second z-axis which is positive in the direction of the first support and the second direction it applies $0 \leq \upsilon_2 \leq \upsilon/2$, whereby a first component at the first tool can be brought into engagement with a second component at the second tool.

7. The plastic welding device according to claim 6, which is an infrared welding device.

8. The plastic welding device according to claim 2, which further comprises a third tool which is arranged at the first support, as well as a fourth tool which is arranged at the second support, wherein
   the third tool is movable by means of a third drive with respect to the first support in a third direction linearly between a first position and a second position and the third direction is a mirroring of the first direction at a first mirrored plane between the first and the third tool so that for a first mirrored inclination angle between the mirrored first z-axis and the third direction with respect to the first inclination angle it applies: $\upsilon_{1S} = \upsilon_1$.

9. Plastic welding device according to claim 8, wherein the fourth tool is movable by means of a fourth drive with respect to the second support in a fourth direction linearly between a first position and a second position and
   the fourth direction is a mirroring of the second direction at a second mirror plane between the second and the fourth tool so that for a second mirrored inclination angle between the mirrored second z-axis and the fourth direction with respect to the second inclination angle it applies: $\upsilon_{2S} = \upsilon_2$.

10. The plastic welding device according to claim 6, which further comprises a third tool which is arranged at the first support, as well as a fourth tool which is arranged at the second support, wherein
    the third tool is movable by means of a third drive with respect to the first support in a third direction linearly between a first position and a second position and
    the third direction is a mirroring of the first direction at a first mirrored plane between the first and the third tool so that for a first mirrored inclination angle between the mirrored first z-axis and the third direction with respect to the first inclination angle it applies: $v_{1S}=v_1$.

11. Plastic welding device according to claim 10, wherein the fourth tool is movable by means of a fourth drive with respect to the second support in a fourth direction linearly between a first position and a second position and the fourth direction is a mirroring of the second direction at a second mirror plane between the second and the fourth tool so that for a second mirrored inclination angle between the mirrored second z-axis and the fourth direction with respect to the second inclination angle it applies: $v_{2S}=v_2$.

\* \* \* \* \*